(12) United States Patent
Tracy et al.

(10) Patent No.: US 7,990,702 B2
(45) Date of Patent: Aug. 2, 2011

(54) CONFIGURABLE INPUT IN A PORTABLE COMPUTING DEVICE

(75) Inventors: Mark S. Tracy, Tomball, TX (US); Britt C. Ashcraft, Tomball, TX (US); Jeffrey A. Lev, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 71 days.

(21) Appl. No.: 12/533,920

(22) Filed: Jul. 31, 2009

(65) Prior Publication Data

US 2011/0026210 A1 Feb. 3, 2011

(51) Int. Cl.
*G06F 1/16* (2006.01)

(52) U.S. Cl. .................................. 361/679.55

(58) Field of Classification Search ............. 361/679.55, 361/679.17, 679.18
See application file for complete search history.

(56) References Cited

U.S. PATENT DOCUMENTS

| | | | |
|---|---|---|---|
| 5,241,303 A | | 8/1993 | Register et al. |
| 5,375,076 A | * | 12/1994 | Goodrich et al. ........ 361/679.17 |
| 5,440,502 A | | 8/1995 | Register |
| 5,550,712 A | * | 8/1996 | Crockett ........................ 361/752 |
| 5,579,487 A | * | 11/1996 | Meyerson et al. ............. 710/100 |
| 5,739,810 A | * | 4/1998 | Merkel .......................... 345/156 |
| 5,768,164 A | * | 6/1998 | Hollon, Jr. ..................... 708/174 |
| 6,259,597 B1 | * | 7/2001 | Anzai et al. ............... 361/679.55 |
| 6,266,241 B1 | * | 7/2001 | Van Brocklin et al. .. 361/679.46 |
| 6,487,069 B1 | * | 11/2002 | Onodera ................... 361/679.09 |
| 6,643,124 B1 | * | 11/2003 | Wilk ........................ 361/679.04 |
| 6,654,234 B2 | * | 11/2003 | Landry et al. ............. 361/679.27 |
| 6,700,773 B1 | * | 3/2004 | Adriaansen et al. ..... 361/679.08 |
| 6,865,075 B2 | * | 3/2005 | Oakley ........................ 361/679.1 |
| 6,930,881 B2 | * | 8/2005 | Karidis et al. ............ 361/679.55 |
| 7,145,766 B2 | * | 12/2006 | Homer et al. ............. 361/679.17 |
| 2003/0026068 A1 | * | 2/2003 | Tsai et al. ..................... 361/683 |
| 2005/0052835 A1 | * | 3/2005 | Wu et al. ....................... 361/681 |
| 2005/0083308 A1 | * | 4/2005 | Homer et al. ................. 345/173 |
| 2006/0034042 A1 | * | 2/2006 | Hisano et al. ................. 361/681 |
| 2006/0044286 A1 | * | 3/2006 | Kohlhaas et al. ............. 345/173 |
| 2009/0190295 A1 | * | 7/2009 | Chin et al. ............... 361/679.27 |
| 2009/0262494 A1 | * | 10/2009 | Ikeda ....................... 361/679.21 |
| 2010/0245209 A1 | * | 9/2010 | Miller et al. ................... 345/1.3 |

* cited by examiner

*Primary Examiner* — Lisa Lea-Edmonds

(57) ABSTRACT

A configurable portable computing device having a first display panel and a second display panel, a first user input device and a second user input device. Where the second user input device is incorporated into the second display panel and the first user input device being selectively mountable over the second display panel or detached from the computing device.

17 Claims, 3 Drawing Sheets

CONFIGURABLE INPUT IN A PORTABLE COMPUTING DEVICE

BACKGROUND

Modern computing devices such as notebook computers utilize a variety and combination of input devices allowing users to interface with and to provide instructions to these computing devices. Combination of keyboard and mouse are often de facto methods typically used with personal computers.

Portable computing devices such as "clamshell" type notebooks and laptops often are equipped with more options for interfacing with the computer. Referring to FIG. 1, many portable computers come with built in keyboards 15, touch pads 18 and pointing sticks 17 (sometimes referred to as eraser head pointers). Touch pads 18 are well like and are often considered indispensable in portable computers.

One other form of the portable computer is commonly known as the Tablet PC. Referring to FIG. 3, Tablet PCs combine a data input capability into a display panel 23 of Tablet PC allowing the entire display panel to be used as a digitizer. The display panel 23 is typically used together with a stylus 23 or digitizer pen which allows users to intuitively use the stylus 23 as an input device. The entire display panel 23 being used as a digitizer provides better input capability than when compared to a touch pad 18 which is much smaller in area. The Tablet PC allows user using the stylus to have highly increased convenience and allows intuitive interaction and input to the Tablet PC.

BRIEF DESCRIPTION OF THE DRAWINGS

For a detailed description of embodiments of the invention, reference will now be made to the accompanying drawings in which.

DETAILED DESCRIPTION

Figure 1:
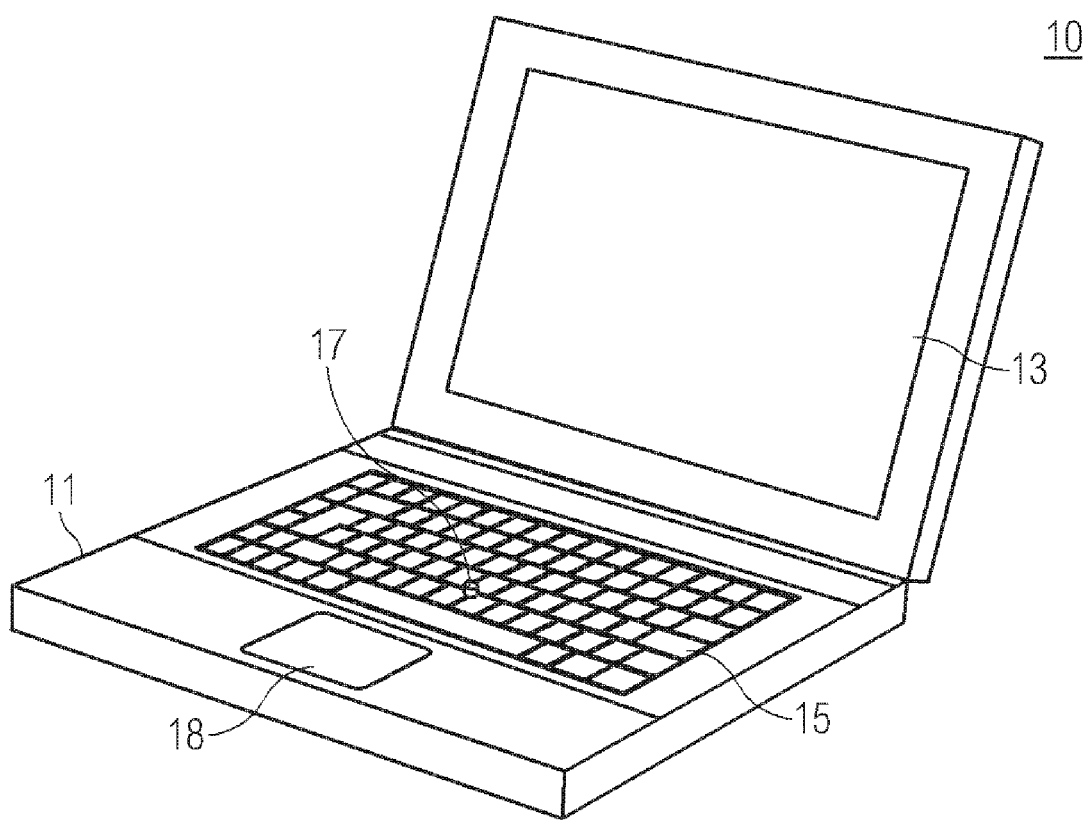
FIG. 1 shows a typical notebook computer having a variety of input devices.
Figure 2:
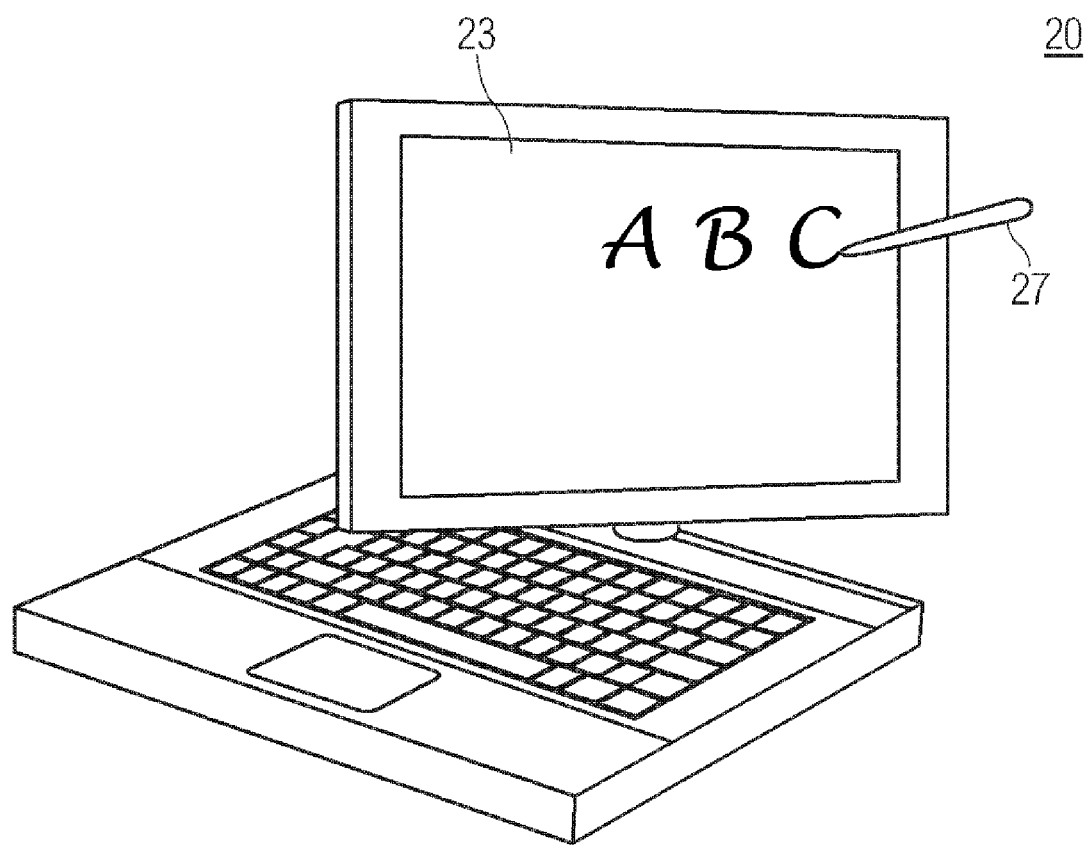
FIG. 2 shows a typical Tablet PC.
Figure 3A:
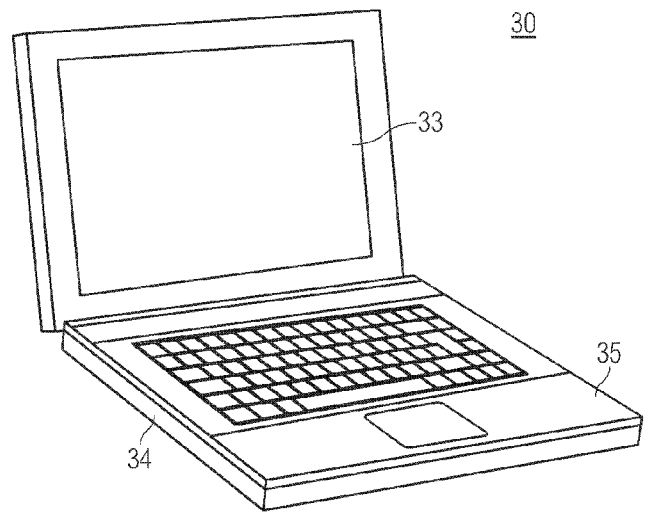
FIG. 3A is a configurable notebook computer in a first configuration in accordance with an embodiment.
Figure 3B:
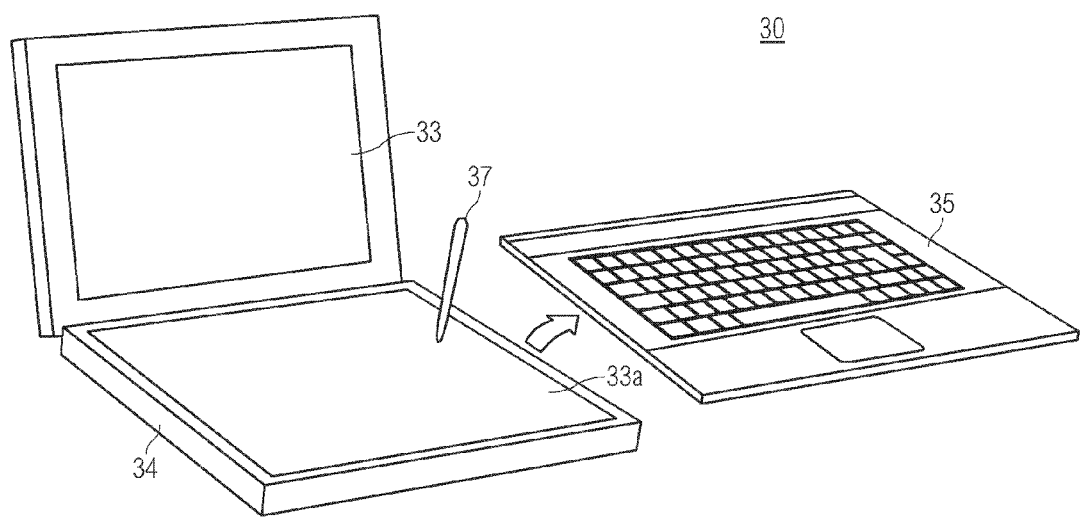
FIG. 3B is the configurable notebook computer in a second configuration in accordance with the embodiment.

Referring to FIG. 3A and FIG. 3B, a configurable portable computing device such as a notebook computer 30 is shown in accordance with a present embodiment.

In the present embodiment, the notebook computer 30 comprises a first display panel 33, a second display panel 33a, a housing 34 for the second display panel 33a and a detachable keyboard module 35.

Referring to FIG. 3A, the first display panel 33 is pivotally attached to the housing 34 for the second display panel 33a. In a first configuration, the notebook computer 30 of the present embodiment resembles a typical "clamshell" style notebook computer. The detachable keyboard module 35 is a first user input device of the notebook computer 30. The keyboard module 35 may be mounted to or on the housing 34 and comprises the standard keys for text input familiar with most PC users. The keyboard module 35 may further comprise other input devices such as buttons, touch pads and pointing sticks. The keyboard module 35 is mounted over the second display panel 33a in a manner which would hide the second display panel 33a. The housing 34 is adapted for attaching or mounting the keyboard module 35. It would be appreciated that the keyboard module 35 and the housing 34 may be equipped with electrical or electronic interfaces to allow communication between the keyboard module 35 and the notebook computer 30.

Referring to FIG. 3B, in accordance with the present embodiment, in a second configuration, the keyboard module 35 is detached from the housing 34 for the second display panel 33a. When the keyboard module 35 is detached from the housing 34. The second display panel 33a is revealed.

The keyboard module 35 may be further equipped with a wireless communication device to enable communication between the keyboard module 35 and the notebook computer 30. This ensures that while the keyboard module 35 is detached from the housing 34, the keyboard module 35 may still be used as an input device to interface with the notebook computer 30. The detachable keyboard module 35 may also utilize conventional wired means such as a USB interface to communicate and act as an input to the notebook computer 30.

With the keyboard module 35 detached from the housing 34, the second display panel 33a is revealed. Referring to FIG. 3B, the second display panel 33a is built into the housing 34 of the notebook computer 30. The first display panel 33 and the second display panel 33a are first and foremost video output devices. Examples of such video output devices in such portable computers are LCD panels and LED displays. With the keyboard module 34 detached, two display panels may be used by the user to increase the available video output real estate available to the user. The notebook computer 30 may further be oriented in a "book" style display with the two display panels side by side.

In accordance with the present embodiment, the second display panel 33a is a second user input device of the notebook computer 30. The second display panel 33a in addition to providing a second video output for the notebook computer, is further adapted with a digitizer capability. In effect, the second display panel 33a is a full sized digitizer built into the notebook computer 30. Users may use a stylus 37 in conjunction with the second display panel 33a to use the digitizer capability as an advanced input device for the notebook computer 30. Alternatively, the digitizer technology incorporated into the second display panel 33a may simply be operated by a user's fingers.

Depending on the digitizer technology incorporated, the digitizer may be operated with a digitizer pen or a stylus 37 or may be operated by a user's fingers. The digitizer technology incorporated may be of passive types, active types or even hybrid digitizer technologies. Optical digitizers may also be used in conjunction with the display panels to enable the display panels to act as input interfaces. An example of digitizer technology that may be incorporated into the second display panel 33a are that developed by Wacom Technology Corporation.

In a further embodiment, the first display panel 33 and the second display panel 33a may both be incorporated with the digitizer technology allowing both display panels to act as input interfaces.

The digitizer functionality may be selectively disabled and both the first and second display panels be used simply as video outputs. The detachable keyboard module is then used as the primary user input device. The detachable keyboard module may wirelessly or even communicate with the notebook computer via conventional wired means such as a USB interface. The devices may further be capable of being even coupled to a docking station adapted for the notebook computer allowing both display panels to be used as video outputs.

In operation, a user would typically be using the notebook computer 30 in the first configuration, which is with the keyboard module 35 mounted to the housing 34. In this first configuration, the notebook computer 30 is in its "clamshell" configuration which resembles the typical way most of such portable computers are utilized. In the keyboard module 35, the direct input into the notebook computer is via the keyboard which is considered the first input device. The keyboard module 35 may further incorporate other forms of input devices such as touch pads and/or pointing sticks.

In a second configuration of the current embodiment, the detachable keyboard module 35 may be detached from the notebook computer 30. In this configuration, the removal or detaching of the keyboard module 35 reveals and allows access to the second display panel 33a of the notebook computer 30.

In effect, the notebook computer 30 is now comprised of two display panels, one pivotally attached to the other. The keyboard module 35 may now be operated in a remote manner from the notebook computer 30. The communication link between the notebook computer 30 and the keyboard module 35 may be wired as in a conventional USB cable or it may be wireless as in using a BLUETOOTH wireless link.

This second configuration advantageously provides to the user a notebook computer 30 with two displays. Furthermore, the second display panel 33a which has been revealed with the detachment of the keyboard module 35 further is incorporated with an alternative input device which is the digitizer. A substantive area of the second display panel 33a or the entire area of the second display panel 33a may now be used as a digitizer input device. This advantageously provides a large format digitizer input device to the user without the associated additional footprint required for a separate conventional digitizer pad.

Numerous variations and modifications will become apparent to those skilled in the art once the above disclosure is fully appreciated.

What is claimed is:

1. A configurable portable computing device comprising:
   a first display panel;
   a second display panel;
   a housing for the second display panel;
   a first user input device mounted to the housing and hiding the second display panel;
   a second user input device;
   wherein the second user input device is incorporated into the second display panel and the first user input device being selectively detachable from the housing to expose the second display panel,
   wherein the second user input device and the second display panel together constitute a touchscreen.

2. The computing device of claim 1, wherein the first display panel is pivotally attached to the housing for the second display panel.

3. The computing device of claim 1, wherein the first user input device is a keyboard module which comprises at least a keyboard.

4. The computing device of claim 3, wherein the second user input device is a digitizer.

5. The computing device of claim 4, wherein the second user input device may be used together with a stylus.

6. The computing device of claim 3, wherein the keyboard further comprises a wireless communication means for providing wireless user input to the computing device when the keyboard is detached from the computing device.

7. The computing device of claim 3, wherein the second user input device may be used in conjunction together with the first user input device.

8. The computing device of claim 4, wherein a digitizer is incorporated into the first display panel.

9. A configurable portable computing device comprising:
   a first display panel;
   a second display panel;
   a housing for the second display panel;
   a first user input device mounted to the housing and hiding the second display panel;
   a second user input device incorporated into the second display panel, the second display panel and the second user input device to ether constituting a touchscreen;
   wherein the computing device may be configured to a second configuration allowing the first user input device, the second user input device, the first display panel and the second display panel to be utilized by detaching the first user input device from the housing.

10. The portable computing device of claim 9, wherein the first display panel is pivotally attached to the housing for the second display panel.

11. The portable computing device of claim 9, wherein the first user input device comprises at least a keyboard.

12. The portable computing device of claim 9, wherein the second user input device comprises a digitizer incorporated into the second display panel.

13. The portable computing device of claim 9, wherein the computing device may be configured to a first configuration by attaching the first user input device to the housing preventing the second display panel and the second user input device from being accessed by a user.

14. The computing device of claim 11, wherein the keyboard further comprises a wireless communication means for providing wireless user input to the portable computing device when the first user input device is detached from the portable computing device.

15. The portable computing device of claim 12, wherein a digitizer is incorporated into the first display panel.

16. The computing device of claim 1, further comprising a component of which the first user input device is a part, the component having a first area, the touchscreen having a second area substantially equal in size to the first area.

17. The computing device of claim 9, further comprising a component of which the first user input device is a part, the component having a first area, the touchscreen having a second area substantially equal in size to the first area.

* * * * *

UNITED STATES PATENT AND TRADEMARK OFFICE
CERTIFICATE OF CORRECTION

| | | |
|---|---|---|
| PATENT NO. | : 7,990,702 B2 | Page 1 of 1 |
| APPLICATION NO. | : 12/533920 | |
| DATED | : August 2, 2011 | |
| INVENTOR(S) | : Tracy et al. | |

It is certified that error appears in the above-identified patent and that said Letters Patent is hereby corrected as shown below:

In column 4, line 22, in Claim 9, delete "to ether" and insert -- together --, therefor.

Signed and Sealed this
Third Day of April, 2012

David J. Kappos
*Director of the United States Patent and Trademark Office*